United States Patent
Mizunuma

[15] 3,639,760
[45] Feb. 1, 1972

[54] X-RAY DIFFRACTION APPARATUS FOR MEASURING STRESS IN A SPECIMEN

[72] Inventor: Mamoru Mizunuma, Tokyo, Japan
[73] Assignee: Rigaku Denki Company Limited, Tokyo, Japan
[22] Filed: Nov. 13, 1969
[21] Appl. No.: 876,258

[52] U.S. Cl. ..................................................250/51.5
[51] Int. Cl. .....................................................G01n 23/20
[58] Field of Search..............................................250/51.5

[56] References Cited

UNITED STATES PATENTS

| | | |
|---|---|---|
| 2,819,405 | 1/1958 | Bond ....................................250/51.5 |
| 3,022,423 | 2/1962 | Shimula et al. .......................250/51.5 |
| 3,114,832 | 12/1963 | Alvarez.................................250/51.5 |
| 3,198,944 | 8/1965 | Furbee..................................250/51.5 |
| 3,368,675 | 2/1968 | Aiken et al........................250/51.5 X |

Primary Examiner—William F. Lindquist
Attorney—Alfred W. Breiner

[57] ABSTRACT

The present invention provides a stress continuously recording apparatus comprising an X-ray tube, two diffracted X-ray detectors and two automatic tracing mechanisms and continuously recording the internal stress of a specimen at its various points by moving it.

2 Claims, 3 Drawing Figures

PATENTED FEB 1 1972    3,639,760
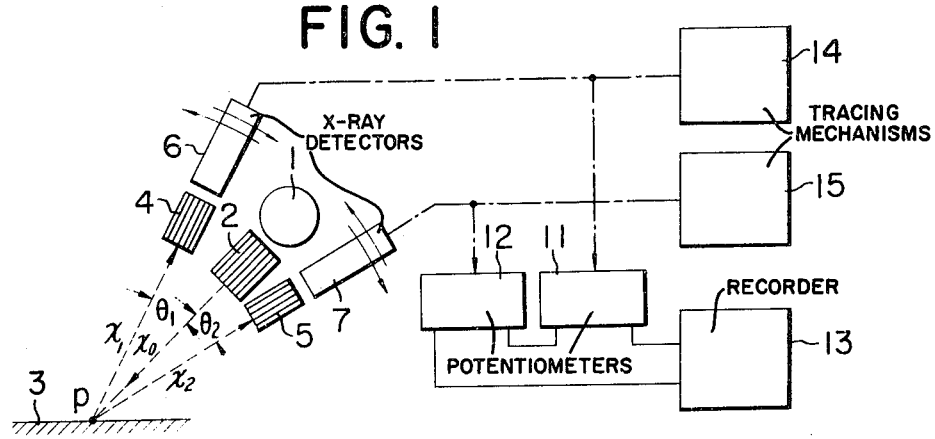
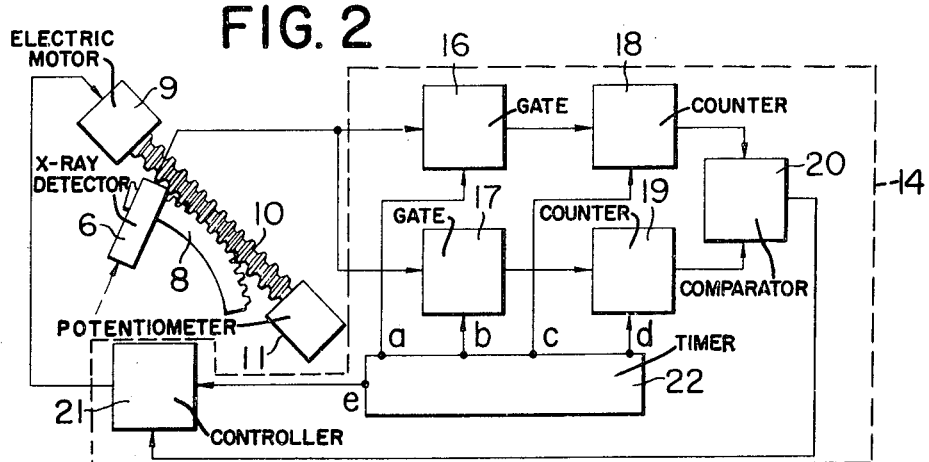
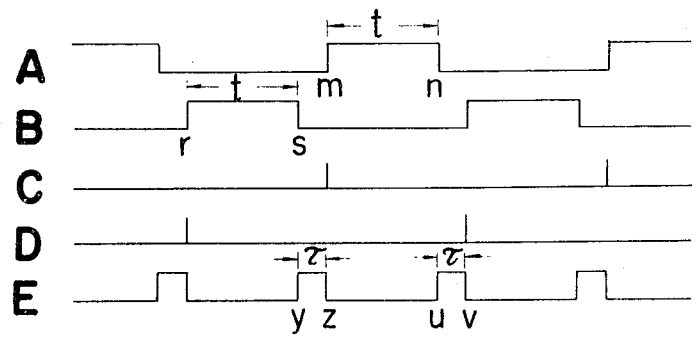

3,639,760

X-RAY DIFFRACTION APPARATUS FOR MEASURING STRESS IN A SPECIMEN

The present invention relates to a stress continuously recording apparatus.

With the aid of X-ray diffraction, the internal stress of metals can be measured; the difference in angle of diffraction between two X-ray beams incident upon the surface of a specimen at 90° and 45° may be found or the difference between inside and outside angles of diffraction of an X-ray beam incident upon the specimen surface at 45° may be found. Hence, in any case at least two measurements of the angle of diffraction were necessary for obtaining the internal stress of the specimen at its one point, so that the internal stress at various points could not be easily, rapidly and continuously measured and recorded.

The object the present invention is to provide an apparatus for continuously measuring and automatically recording the internal stress of a specimen at various points.

In the accompanying drawing:

FIG. 1 is a view illustrating an embodiment of the apparatus according to the present invention;

FIG. 2 is a partial block diagram of the apparatus in FIG. 1; and

FIG. 3 is time-pulse waveform diagram for the apparatus in FIG. 1.

In the apparatus in FIG. 1, a soller slit 2 is arranged in front of an X-ray tube 1, through which an X-ray beam $x_0$ is projected onto the surface of a specimen 3 at 45°. X-ray detectors 6 and 7 having soller slits 4 and 5 are provided on both sides of the X-ray tube 1 in a plane perpendicular to the specimen surface and containing the path of X-rays. These detectors are mounted, for example, on a toothed sector, such as sector 8 (FIG. 2) which is adapted to be rotatable about the point of incidence P of the X-rays on the specimen surface and, as illustrated, carries detector 6. The toothed sector 8 meshes with a worm 10 connected to an electric motor 9. Thus, the detectors 6 and 7 can be rotated about the point P as shown by arrows in FIG. 1. Connected to the worm 10 and a similar worm (not illustrated) are respectively potentiometers 11 and 12 (FIG. 1), the output terminals of which are connected to the input terminals of an automatic recorder 13 in series with each other and in opposite polarity. Further, the electric motor 9 for driving the detectors 6 and 7 are controlled by automatic tracing mechanisms 14 and 15.

The X-ray beam $x_0$ incident upon the specimen surface 3 at the point P is diffracted on its both sides at angles of $\theta_1$ and $\theta_2$. If the specimen surface has no strain due to internal stress within the above-mentioned plane, the angles of diffraction $\theta_1$ and $\theta_2$ are equal to each other. The internal stress is given by $k(\theta_1-\theta_2)$, wherein $k$ is a proportional constant. The detectors 6 and 7 serve for detecting the diffracted X-ray beams $x_1$ and $x_2$. The output of the detector 6 is applied through gate circuits 16 and 17 to counters 18 and 19, as shown in FIG. 2, and the results counted by the counters 18 and 19 are compared by a comparator 20 and applied to a controller 21 of the motor 9.

A timer 22 emits from its terminals $a$, $b$, $c$, $d$ and $e$ control pulses drawn in FIG. 3 as A, B, C, D and E, which are applied to the gate circuits 16, 17, the counters 18, 19 and the controller 21, respectively. Thus, when the gate circuit 16 receives a rectangular pulse A, it opens to transmit the output pulses of the detector 6 to the counter 18. At the same time, a resetting pulse C is applied to the counter 18 to clear the existing counted value. Namely, the counter 18 counts the number of output pulses of the detector 6, for example, during the time $t$ between the time points $m$ and $n$. On the other hand, as the gate circuit 17 and the counter 19 receive the pulses B and D, the number of output pulses of the detector 6 during the time $t$ between the time points $r$ and $s$ is kept on the counter 19. Hence, the counted values from $r$ to $s$ and from $m$ to $n$ are applied to the comparator 20 at the time point $n$.

If they are equal or the former is greater, the comparator 20 applies a negative signal voltage to the controller 21 and, if the letter is greater, a positive signal voltage is applied. Since a driving signal pulse E is applied to the controller 21, the motor 9 rotates during a determined time between the time points $u$ and $v$ in the clockwise direction if a positive signal voltage is applied, and in the counterclockwise direction if a negative signal voltage is applied. Assuming that the motor 9 has rotated in the clockwise direction during the time $\tau$ between $y$ and $z$ and that the counted value from $m$ to $n$ is greater than from $r$ to $s$, the motor rotates further in the same direction during the time $\tau$ between $u$ and $v$, while it rotates in the opposite direction if the former counted value is equal to or smaller than the latter. Hence, the detector 6 moves to a position where the incident X-rays attain the maximum. The same applies to the detector 7; it takes always a position where it receives the maximum X-rays with the aid of an automatic tracing mechanism 15 (FIG. 1), which is constructed identically to tracing mechanism 14 as shown in detail in FIG. 2, an electric motor, a sector and a worm. Since the potentiometers 11 and 12 are connected to the detectors 6 and 7, respectively, the output voltage of each of the potentiometers is proportional to the angle of diffraction $\theta_1$ or $\theta_2$. The recorder 13 receives, therefore, a voltage proportional to the difference of the angles of diffraction $(\theta_1-\theta_2)$ and records its value. When a specimen is moved horizontally in FIG. 1 or in a direction perpendicular to the plane of drawing, the detectors 6 and 7 move to a position where they will receive the maximum diffracted X-rays, so that the difference of the angles of diffraction $(\theta_1-\theta_2)$ at individual points on the specimen surface, i.e., a value proportional to the internal stress of the specimen, is continuously recorded.

In this way, the apparatus according to the present invention is capable of recording continuously the internal stress of a specimen at individual points by moving the specimen, so that very easy and rapid detection of positions having any internal deformation is possible without the necessity of performing any complicated measuring and calculating operations. Therefore, if used for nondestructive test of metallic materials, it provides highly efficient and accurate inspection.

While in the described invention, X-rays are projected onto the specimen surface at 45° with the use of an X-ray tube, it is also possible to use two X-ray tubes for projecting X-rays onto the specimen surface simultaneously at 45° and 90°. In this case, X-ray detectors are arranged on both sides of each X-ray tube in a plane containing the two incident X-ray beams for detecting the diffracted X-rays of the respective beam, and automatic tracing mechanisms which enable the maximum output of the detectors to be attained are provided. Further, a potentiometer is connected to each of the detectors. Thus, stress measurement through a so-called 90°–45°-system can be carried out.

What is claimed is:

1. A stress continuously recording apparatus comprising an X-ray tube for applying X-rays via a path to a surface of a specimen; two movable diffracted X-ray detectors; means for rotating each of said X-ray detectors about a point of incidence of the X-rays on said surface in a plane perpendicular to said surface and containing said path over which the X-rays are projected from said X-ray tube to said surface of the specimen; means responsive to outputs from said two X-ray detectors for swiveling said X-ray detectors so as to enable their outputs to attain always a maximum; two potentiometers coupled respectively to the means for swiveling said X-ray detectors for providing an output on their respective output terminals indicative of position of said X-ray detectors; and an automatic recorder having input terminals to which the output terminals of said potentiometers are connected in series and in opposite polarity, whereby the difference in angles of diffraction at individual points on said surface of the specimen and thus a value proportional to the internal stress of the specimen may be determined and recorded.

2. A recording apparatus according to claim 1 wherein means are provided for applying X-rays to said surface of the specimen surface at angles of 45° and 90°.